United States Patent [19]

Andreasson et al.

[11] Patent Number: 4,910,846
[45] Date of Patent: Mar. 27, 1990

[54] METHOD OF ADJUSTING THE AXIAL PLAY BETWEEN A JOURNALLED SHAFT AND A SURROUNDING BEARING CASING

[75] Inventors: Sture Andreasson, Uddevalla; Sven Gulbrandsen, Trollhattan, both of Sweden

[73] Assignee: Volvo Hydraulik AB, Trollhattan, Sweden

[21] Appl. No.: 298,088

[22] Filed: Jan. 18, 1989

[30] Foreign Application Priority Data

Jan. 22, 1988 [SE] Sweden ............................. 8800211

[51] Int. Cl.$^4$ .............................................. B21D 53/00
[52] U.S. Cl. ................................ 29/898.061; 384/626
[58] Field of Search ................ 29/148.4 A, 148.4 C, 29/434, 525.1; 384/626

[56] References Cited

U.S. PATENT DOCUMENTS

| | | | |
|---|---|---|---|
| 3,785,023 | 1/1974 | Harbottle | 29/148.4 A |
| 4,054,999 | 10/1977 | Harbottle | 29/148.4 A |
| 4,150,468 | 4/1979 | Harbottle | 29/148.4 A |
| 4,476,614 | 10/1984 | Pittroff | 29/148.4 A |
| 4,477,030 | 10/1984 | Vifian et al. | 384/626 |
| 4,687,411 | 8/1987 | Maeda et al. | 384/626 |
| 4,730,995 | 3/1988 | Dewhirst | 384/626 |
| 4,767,225 | 8/1988 | Iio | 384/626 |

Primary Examiner—Timothy V. Eley
Assistant Examiner—Irene Cuda
Attorney, Agent, or Firm—Pollock, Vande Sande and Priddy

[57] ABSTRACT

A cylindrical roller bearing of the kind having a separate abutment ring at the inner bearing ring is used to provide intentional compensation of axial play between a journalled shaft and the surrounding bearing casing in a bearing combination which comprises at least one conical roller bearing in addition to said cylindrical roller bearing. The axial position abutment of the inner ring of the cylindrical roller bearing on the shaft to be journalled is located with an axial spacing from the position abutment surface of the outer ring of said bearing in the casing, which spacing corresponds to the maximum expected axial play which is to be compensated for, and spacing means of required thickness are then mounted between the abutment ring and a locking member on the shaft.

2 Claims, 1 Drawing Sheet

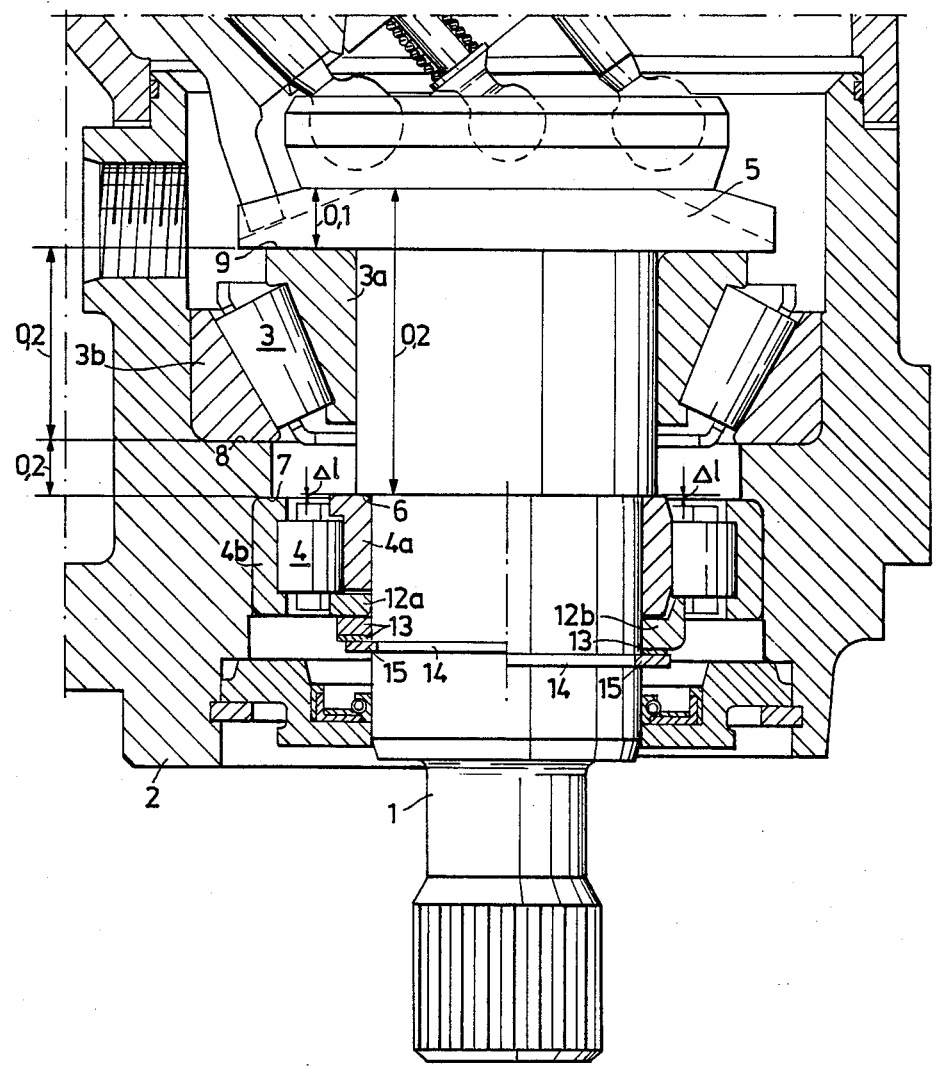

METHOD OF ADJUSTING THE AXIAL PLAY BETWEEN A JOURNALLED SHAFT AND A SURROUNDING BEARING CASING

BACKGROUND OF THE INVENTION

The present invention relates to arrangements for adjusting the axial play between a journalled shaft and a surrounding bearing casing, and is more particularly concerned with the use of a cylindrical roller bearing of the type having a separate abutment ring at the inner bearing ring for providing an intentional compensation of axial plays between the journalled shaft and the surrounding bearing casing.

The journaling of shafts which are subject to simultaneous radial and axial loads has in the past normally been effected by the use of conical roller bearings, with two such bearings oriented opposite to one another being employed in heavy-duty situations. By way of example, in axial piston machines in which a machine shaft is connected to a drive disk the shaft is often journalled in two mutually opposite conical roller bearings.

It is well known that in many journaling arrangements, not limited to axial piston machines, it is difficult to "build away" manufacturing tolerances without those tolerances superimposing themselves on one another so as to require a bearing play adjustment or compensation at the time of final assembly of the journal. Such adjustments become particularly difficult in cases such as the axial piston machines to which reference has been made above where there is a rotary inner ring load which is applied to the conical roller bearings, since the inner rings of such conical roller bearings must then be mounted with a press fit on the shaft. In such an arrangement precise axial play adjustments of the shaft require the use of expensive and complicated fixtures and dial indicators, making the adjustment very time consuming and expensive particularly in mass production situations. If only a small number of such journals must be manufactured, a skilled worker can gradually learn to tighten the two conical roller bearings against one another by means of an abutment nut that is threaded onto the shaft, or by means of shims or the like, so as to achieve just enough rolling resistance of the conical roller bearings. Adjustments of this type are dependent upon the skill of the worker, however, and cannot be employed by comparatively unskilled workers in the course of maintenance of the journalled shaft, or when bearings are replaced by users of the machine. There has long been a need, therefore, to provide an effective solution of this journaling problem.

The present invention provides such a solution by permitting the adjustment of clearance or play to be carried our manually in a fast and simple operation without requiring use of the expensive and complicated fixtures and dial indicators which have been considered necessary heretofore.

SUMMARY OF THE INVENTION

The present invention is based on the recognition that modern cylindrical roller bearings are capable of withstanding substantial axial loads as well as radial loads. As a result, by using a particular kind of such cylindrical roller bearing in a bearing combination which comprises at least one additional conical roller bearing, namely by use of a cylindrical roller bearing of the type having a separate abutment ring at the inner ring of the bearing to provide an intentional axial play compensation between a journalled shaft and the surrounding bearing casing, the axial position abutment of the inner ring of the cylindrical roller bearing on the shaft to be journalled can be located with an axial spacing from the position abutment surface of the outer ring of said bearing in the casing, which spacing corresponds to the maximum expected axial play which is to be compensated, and shims of required thickness can then be mounted between the abutment ring and a locking member on the shaft.

Using such a bearing arrangement, the required axial play compensation can be effected by manual insertion of a required number of shims of selected thickness. This is a very fast, simple and inexpensive operation, and it can be carried out very easily without use of expensive fixtures and dial indicators. Therefore the method of the present invention is particularly well suited for use in the series production of shaft journals of the kind referred to above.

BRIEF DESCRIPTION OF THE DRAWINGS

The foregoing objects and advantages of the present invention will become readily apparent from the subsequent description, taken together with the accompanying single sheet of drawings which diagrammatically illustrates examples of bearing mountings of the machine shaft of an axial piston machine connected to a drive disk, the drawing illustrating use of one commercially available type of cylindrical roller bearing to the left of the center line of the shaft, and illustrating the use of an alternative type of commercially available cylindrical roller bearing to the right of the center line of the shaft.

DESCRIPTION OF THE PREFERRED EMBODIMENTS

As shown in the drawing, a machine shaft 1 is rotatably journalled in a surrounding bearing casing by means of two roller bearings, namely, on the one hand, one or more conical roller bearings 3 and, on the other hand, a cylindrical roller bearing 4. The illustrated journal is intended to take into consideration manufacturing tolerances of the shaft 1 and a drive disk 5 which is connected to said shaft.

In the illustrated embodiment of the invention, the manufacturing tolerance of the thickness of the axial dimension of the drive disk 5 is 0.1 mm. The tolerance between the upper surface of the axial end surface of the drive disk 5 and the bearing abutment surface 6 on the shaft 1 for the inner ring 4a of the cylindrical roller bearing 4 is 0.2 mm. The tolerance between the bearing abutment surface 7 of the outer ring 4b of the cylindrical roller bearing 4 and the bearing abutment surface 8 of the outer ring 3b of the conical roller bearing 3 is 0.2 mm. The tolerance between said abutment surface 8 and the lower side of drive disk 5 or the bearing abutment surface 9 of the inner ring 3a of conical roller bearing 3 is 0.2 mm. The maximum axial play $\Delta 1$ which can thus occur on the shaft 1 relative to bearing casing 2 can thus total 0.7 mm, and that maximum axial play must be compensated by means of an appropriate adjustment.

The present invention simplifies the necessary adjustment by use of a cylindrical roller bearing 4 of the type having a free abutment ring 12a or a free angular ring 12b at one side of the inner ring 4a of the cylindrical roller bearing. Cylindrical roller bearings of these types are commercially available, e.g., cylindrical roller bearings of the type marketed by SKF under their designation series NJ with an angular ring series HJ as well as series NUP with an abutment ring. Axial plays of the order of up to 0.7 mm can easily be compensated by a cylindrical roller bearing with such a free abutment or angular ring, without deteriorating or detracting from the support capability of the bearing or its life under conditions of combined axial and radial loads, notwithstanding the fact that the roller bearing manufacturer did not intend that a play or gap of such magnitude should actually be present between the inner ring and the free abutment ring or the annular ring in bearings of these types.

In practicing the method of the present invention, the two outer rings 3b and 4b of the bearings 3 and 4 are first suitably mounted in appropriate positions in bearing casing 2 with their respective conical and cylindrical rollers. The shaft 1 with inner rings 3a and 4a for the said bearings 3 and 4 are then inserted into the bearing casing 2. After the abutment ring 12a or the angular ring 12b, each of which is freely movable on the shaft, is mounted into engagement with the roller of the cylindrical roller bearing 4, the maximum axial play $\Delta 1$ which is anticipated in the journal is compensated by placing one or more annular shims 13 of suitable thickness between the ring 12a or 12b, respectively, and a locking ring 15 or the like is then fitted into a groove 14 on the shaft. The insertion of such shims or spacers can be so effected that positive as well as negative play, or zero play, can be obtained if desired.

Having thus described our invention, we claim:

1. The method of rotatably journalling a shaft comprising the steps of assembling a shaft to be journalled in a combination bearing consisting of at least one conical roller bearing and a cylindrical roller bearing positioned in axially spaced relation to one another in a bearing casing, each of said bearings having an outer ring which is mounted in said bearing casing and an inner ring which engages the outer periphery of said shaft, said cylindrical roller bearing being of the type having a separate abutment ring adjacent the inner bearing ring of said cylindrical roller bearing which is in engagement with and axially displaceable relative to the outer surface of said shaft, adjusting the axial position of said separate abutment ring of said cylindrical roller bearing to axially space the abutment position of said inner ring of said roller bearing on said shaft from the abutment position of said outer ring of said roller bearing in said casing by a maximum expected axial play of said shaft relative to said casing which is to be compensated for, and then inserting spacing means between said abutment ring and a locking member on said shaft.

2. The method of claim 1 wherein said inserting step comprises placing annular shim means of preselected thickness between said abutment ring and an annular locking ring that is fitted into a groove on said shaft.

* * * * *